April 26, 1938.　　　F. N. ROSS　　　2,115,179
UPHOLSTERY FASTENER
Filed July 29, 1935
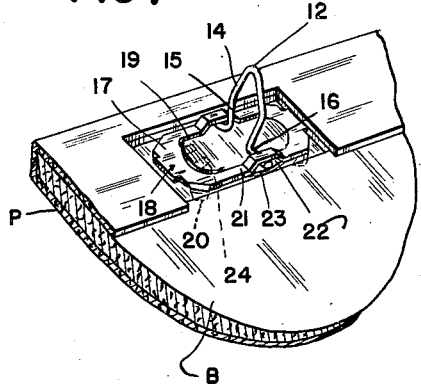
FIG.1
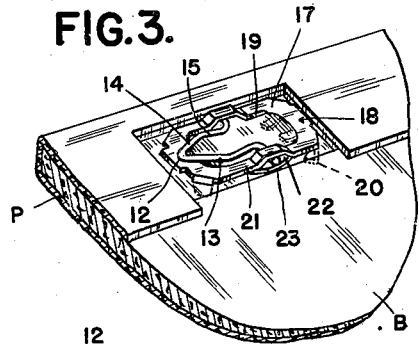
FIG.3.
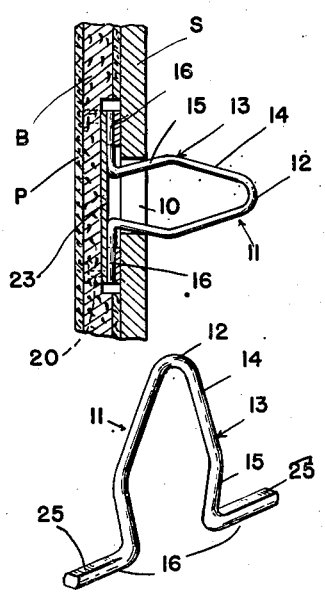
FIG.2.
FIG.5.
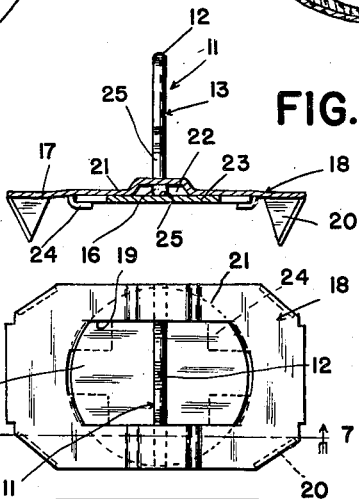
FIG.7.
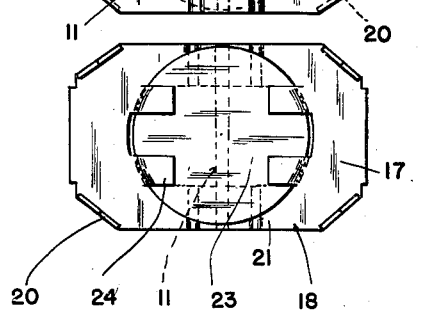
FIG.4.
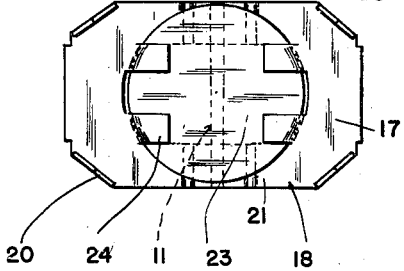
FIG.6.
INVENTOR
FREDERICK N. ROSS
BY
ATTORNEYS Patented Apr. 26, 1938

2,115,179

UNITED STATES PATENT OFFICE 2,115,179

UPHOLSTERY FASTENER

Frederick N. Ross, Grosse Pointe Park, Mich., assignor to Briggs Manufacturing Company, Detroit, Mich., a corporation of Michigan Application July 29, 1935, Serial No. 33,767

14 Claims. (Cl. 24—215)

This invention relates generally to fastener elements, and refers particularly to snap fastener devices of the type especially designed for detachably securing trim panels and the like to supports, such for example, as the framework of motor vehicle bodies.

More particularly, this invention contemplates a fastener assembly of the type having a fastener element and having means for anchoring the latter to the trim panel, permitting the same to be moved from an operative position perpendicular to the panel to an inoperative position substantially parallel with the trim panel permitting the panels to be conveniently stacked.

One of the principal objects of this invention consists in the provision of a fastener assembly of the character set forth in the preceding paragraph, wherein the means for anchoring the fastener element to the trim panel also provides for relatively free universal movement of the fastener element relative to the trim panel in the plane of the latter, and thereby permits the element to align itself with the aperture in the body framework within which the same is adapted to be engaged.

Another advantageous feature of this invention resides in the novel means employed for yieldably resisting movement of the fastener element from an operative position substantially perpendicular to the trim panel to an inoperative position substantially parallel to the panel.

A further advantageous feature of this invention resides in the novel construction of the fastener assembly which permits the same to be economically manufactured, assembled and installed.

The foregoing, as well as other objects, will be made more apparent as this description proceeds, especially when considered in connection with the accompanying drawing, wherein:

Figure 1 is a fragmentary perspective view of a trim panel having one of my improved fastener assemblies attached thereto;

Figure 2 is a sectional view showing the trim panel in assembled relation with a support;

Figure 3 is a view similar to Figure 1 showing the fastener element moved to inoperative position;

Figure 4 is a top elevational view of the fastener element assembly;

Figure 5 is a perspective view of the fastener element employed in the assembly;

Figure 6 is a bottom elevational view of the fastener element assembly, and

Figure 7 is a sectional view taken substantially on the plane indicated by the line 7—7 of Figure 4.

While it will be apparent as this description proceeds, that the fastener element assembly forming the subject matter of this invention is capable of many and diversified uses, nevertheless, for the purpose of illustration the same is shown herein as employed for fastening the upholstery or trimming material panels to the framework of a motor vehicle body.

Referring now more in detail to the drawing, it will be noted that the reference character S in Figure 2 indicates a support to which the upholstery or trimming panel P is adapted to be attached. In the present embodiment of the invention, the support S constitutes a portion of the framework of a motor vehicle body and is provided with apertures 10 through which the fastener elements 11 project. As will be more fully hereinafter set forth, the size of the apertures 10 is predetermined in dependence upon the size of the fastener elements, so that the latter will cooperate with the edges of the apertures to resiliently hold the trim panel into engagement with the support.

In the present instance, the fastener element 11 is formed of a single strip of spring wire or the like, bent intermediate its ends to form a nose 12 predeterminedly proportioned with respect to the openings 10 to act as a pilot to facilitate the insertion of the fastener elements into the apertures 10 of the supporting structure. Extending from the nose 12 is a pair of resilient legs 13 which are bowed intermediate their length to form diverging portions 14 leading directly from the nose and to form converging portions 15 at the ends of the portions 14. The distance between the bowed intermediate portions of the fastener element is greater than the width of the apertures 10 in the supporting structure S, and the ends of the legs are free from connection with each other, so that insertion of the fastener element into one of the apertures 10 causes the legs 13 to spring toward one another sufficiently to permit the bowed portions to pass through the aperture. As soon as the bowed portions are extended through the aperture, the legs are permitted to spring apart, due to the fact that the portions 15 of the legs converge, to resiliently engage the opposite edges of the aperture, as is well known in this art.

As will be observed, particularly from Figure 5, the extremities of the legs 13 of the fastener element terminate in oppositely projecting substantially cylindrical extensions 16 forming means for attaching the fastener element to the retainer or anchorage unit 17 about to be described. The anchorage unit 17 comprises a sheet metal stamping 18 in the form of a plate having a rectangularly shaped opening 19 therethrough and having prongs 20 at the corners thereof to provide for securing the plate to the backing B of the trim panel. The portions 21 of the plate 18 forming the opposite longitudinal sides of the opening 19 are bent laterally out of the plane of the plate to provide aligned recesses 22 in the underside of the plate for receiving the extensions 16 on the fastener element 11. The extensions 16 are retained within the recesses 22, by means of a spring metal disk 23 engaging the underside of the plate 18 and permanently secured thereto by means of legs 24 formed integral with the plate 18. As shown in Figure 7, the recesses 22 are elongated in the direction of length of the plate, or in other words, in a direction transverse to the extensions 16, so as to not only permit relatively free angular movement of the fastener element relative to the retainer assembly, in the plane of the trim panel, but to also permit shifting the element in said plane longitudinally of the plate 18. In addition, attention is directed to the fact that the distance between the recesses 22 is greater than the free ends of the legs 13 of the fastener element 11, so as to provide for shifting the element in the plane of the trim panel transversely of the plate 18. The foregoing is of particular importance in the present application of the fastener element, since it permits the latter to align itself with respect to the opening 10 in the supporting structure S.

It will be apparent that the foregoing construction also permits the fastener element 11 to be swung from an operative position perpendicular to the anchorage plate 18 to an inoperative position substantially parallel with this plate, so as to permit stacking the trim panels without interference from the fastener element assemblies. In the present instance, swinging movement of the fastener element from its operative to its inoperative position is resisted sufficiently to prevent this movement from taking place accidentally upon applying the trim panel to the supporting structure. This latter feature is accomplished in the present instance, by providing flats 25 on one or both of the extensions 16. In the illustrative embodiment of the invention, both of the extensions 16 are provided with flats 25 on diametrically opposite sides thereof, and the depth of the recesses 22 is predetermined so that when the fastener element is perpendicular to the anchorage plate 18, the flats on one side of the extensions engage the flexible disk 23, and the flats on the opposite side engage the walls of the recesses 22. With this construction, it will be observed that movement of the fastener element from a position perpendicular to the anchorage plate to a position substantially parallel with respect to said plate is yieldably resisted by the flexible disk 23. Inasmuch as the extensions 16 engage the portions of the flexible disk midway between the securing lugs 24, and in view of the fact that the disk is of relatively light gage spring metal, it necessarily follows that the disk may be flexed by the extensions without exerting undue force on the leg portions 13 of the fastener element. While the slight flexure of the disk required to permit the fastener element to be moved from its operative position to its inoperative position is usually permitted, even though the disk engages the backing B, nevertheless, if the backing is of such a nature as to actually prevent this limited flexing of the disk, it will be apparent that the portions 21 of the anchorage plate 18 will flex sufficiently to effect the desired action previously set forth. In any event, the construction is such as to yieldably prevent accidental swinging movement of the fastener element from its operative to its inoperative position, and to permit this movement by a flexing of either or both of the disk and portions 21 of the anchorage plate.

As previously stated, the corners of the anchorage plate 18 are provided with prongs 20 adapted to be projected into the backing member B of the trim panel to secure the fastener assembly to the latter, and in the present instance, provision is made for securing the assemblies to the backing member adjacent the marginal edges thereof. The above is accomplished in the present instance by inclining the corners of the anchorage plate, provided with the prongs, inwardly with respect to the longitudinal median line of the plate at such an angle that the prongs will pierce the backing a substantial distance inwardly from the marginal edge of the latter even though one side edge of the plate coincides with this marginal edge.

Referring now to the operation of my improved fastener assembly and assuming that the fastener element is in its inoperative position shown in Figure 3, it will be noted that when it is desired to assemble the trim panel with a supporting structure, each of the elements is first swung about the axis of the attaching portions 16 from its inoperative position substantially parallel to the panel surface to its inoperative position substantially perpendicular to this surface. The trim panel equipped with the fastener elements may then be secured to the supporting structure S by engaging the fastener elements 11 with the apertures 10 formed in the supporting structure. During engagement of the fastener elements with the apertures, the leg portions 13 are moved toward one another, as previously explained, but swinging movement of the fastener elements out of their perpendicular planes is resisted by reason of the fact that in the operative position of the fastener elements, the opposed flats 25 on the extensions 16 respectively engage the disk 23 and portions 21 of the anchorage plate 18. It will also be observed that while swinging movement of the fastener elements is yieldably resisted, nevertheless, the latter may be readily angularly adjusted so as to insure registration thereof with the apertures 10 in the supporting structure. As a matter of fact, the construction is such as to provide for universal movement of the fastener element when the latter is in its operative position, in that the same is not only capable of angular adjustment, previously referred to, but may also be moved bodily transversely of the anchorage plate 18, as well as longitudinally of this plate. This construction materially facilitates assembly in that it is capable of compensating for relatively large manufacturing inaccuracies that oftentimes exist in production.

While an embodiment of this invention has been described and illustrated herein, somewhat in detail, it will be readily apparent to those skilled in this art that various changes in the details of construction may be resorted to without departing from the spirit and scope of this invention, and to this end reservation is made to make such changes as may come within the purview of the accompanying claims.

What I claim as my invention is:

1. A separable snap fastener for detachably securing a member to a support having an aperture therein, comprising a fastener element having outwardly bowed leg portions insertable within the aperture and engageable with the side walls of said aperture to maintain the element in assembled relation with the support, said leg portions having opposed extensions at one end thereof, anchorage means secured to the member aforesaid and having bearings rotatably receiving the extensions, said bearings being elongated in a direction extending substantially at right angles to the extensions to provide a limited relatively free angular shifting movement of the legs with respect to the anchorage means in addition to said rotative movement.

2. A separable snap fastener for detachably securing a trim panel to a support having an opening therethrough, comprising a fastener element having outwardly bowed leg portions normally disposed in a plane substantially perpendicular to the plane of the panel and insertable within the opening and engageable with the side edges of said opening to maintain the element in assembled relation with the support, said leg portions terminating in opposed extensions and one of the extensions having a flat surface disposed in a plane extending at substantially right angles to the perpendicular plane aforesaid of the legs, a retainer unit secured to the trim panel having bearings rotatably receiving the extensions to provide movement of the legs from a position in the plane aforesaid to a position in a plane substantially parallel to the plane of the trim panel, and flexible means on the retainer unit and having a bearing engagement with the flat on said extension to resist movement of the legs from a position in said perpendicular plane.

3. A separable snap fastener for detachably securing a trim panel to a support having an opening therethrough, comprising a fastener element having outwardly bowed leg portions normally disposed in a plane substantially perpendicular to the plane of the panel and insertable within the opening and engageable with the side edges of said opening to maintain the element in assembled relation with the support, said leg portions having opposed extensions provided with diametrically opposed flat surfaces located in parallel planes extending at right angles to the perpendicular plane of the legs, a retainer unit secured to the trim panel having aligned bearings rotatably receiving the portions of the extensions provided with the flat surfaces, one side of each of the bearings being flat and engageable with one of the flat surfaces of each extension, the flat sides aforesaid of the bearings also being flexible to resist pivotal movement of the legs out of the perpendicular plane aforesaid.

4. A separable snap fastener for detachably securing a trim panel to a support having an opening therethrough, comprising a fastener element having outwardly bowed leg portions normally disposed in a plane substantially perpendicular to the plane of the panel and insertable within the opening and engageable with the side edges of said opening to maintain the element in assembled relation with the support, said leg portions terminating in opposed extensions and one of the extensions having a flat surface disposed in a plane extending at substantially right angles to the perpendicular plane aforesaid of the legs, a retainer unit secured to the trim panel having aligned bearings rotatably receiving the extensions to provide movement of the legs from a position in said perpendicular plane to a position in a plane substantially parallel to the plane of the trim panel, the side of the bearing adjacent the flat surface also being flat and engageable with the latter surface and being flexible to yieldably resist the aforesaid movement.

5. A separable snap fastener for detachably securing a trim panel to a support having an opening therethrough, comprising a fastener element having outwardly bowed leg portions normally disposed in a plane substantially perpendicular to the plane of the panel and insertable within the opening and engageable with the side edges of said opening to maintain the element in assembled relation with the support, said leg portions having opposed extensions provided with diametrically opposed flat surfaces located in parallel planes extending at right angles to the perpendicular plane of the legs, a retainer unit secured to the trim panel having aligned bearings rotatably receiving the portions of the extensions provided with the flat surfaces and elongated in a direction to provide limited relatively free angular movement of the element in a path parallel to the plane of the trim panel, the side of each of the bearings adjacent the flat surfaces also being flat for engagement with the latter surfaces and also being flexible to resist pivotal movement of the legs out of the perpendicular plane aforesaid.

6. A separable snap fastener for detachably securing a trim panel to a support having an opening therethrough, comprising a fastener element having outwardly bowed leg portions normally disposed in a plane substantially perpendicular to the plane of the panel and insertable within the opening and engageable with the side edges of said opening to maintain the element in assembled relation with the support, said leg portions having opposed extensions provided with diametrically opposed flat surfaces located in parallel planes extending at right angles to the perpendicular plane of the legs, a retainer unit secured to the trim panel having aligned bearings rotatably receiving the portions of the extensions provided with the flat surfaces and having parallel walls engaging the flat surfaces on the extensions, one of the walls being flexible to resist pivotal movement of the legs out of the perpendicular plane aforesaid.

7. A separable snap fastener for detachably securing a trim panel to a support having an opening therethrough, comprising a fastener element having outwardly bowed leg portions normally disposed in a plane substantially perpendicular to the plane of the panel and insertable within the opening and engageable with the side edges of said opening to maintain the element in assembled relation with the support, said leg portions having opposed extensions provided with diametrically opposed flat surfaces located in parallel planes extending at right angles to the perpendicular plane of the legs, a retainer unit secured to the trim panel having aligned bearings rotatably receiving the portions of the extensions provided with the flat surfaces and having parallel walls engaging the flat surfaces on the extensions, one of the walls being flexible to resist pivotal movement of the legs out of the perpendicular plane aforesaid, and said bearings being elongated in a direction to provide limited relatively free angular movement of the element relative to the trim panel.

8. A separable snap fastener for detachably securing a member to a support having an aperture therein, comprising a fastener element having leg portions insertable within the aperture and engageable with the side walls of the aperture to maintain the element in assembled relation with the support, said leg portions having laterally projecting axially aligned extensions at one end thereof, an anchorage plate secured to the member aforesaid, and a disc member cooperating with portions of the anchorage plate to form axially aligned bearings rotatably receiving the extensions on said legs.

9. A separable snap fastener for detachably securing a member to a support having an aperture therein, comprising a fastener element having leg portions insertable within the aperture and engageable with the side walls of the aperture to maintain the element in assembled relation with the support, said leg portions having laterally projecting extensions at one end thereof, an anchorage plate secured to the member aforesaid, and a flexible disc secured to the anchorage plate and cooperating with portions of the latter at opposite sides thereof to form bearings rotatably receiving the extensions on said legs to permit movement of the legs from a position substantially perpendicular to the member to a position substantially parallel to the latter.

10. A separable snap fastener for detachably securing a member to a support having an aperture therein, comprising a fastener element having leg portions insertable within the aperture and engageable with the side walls of the aperture to maintain the element in assembled relation with the support, said leg portions having opposed extensions at one end thereof, means rotatably receiving the extensions providing pivotal movement of the legs about the axes of the extensions, said means including an anchorage plate secured to the member aforesaid, and a flexible element cooperating with the anchorage plate to yieldably maintain the legs in a predetermined position with respect to said member.

11. A separable snap fastener for detachably securing a member to a support having an aperture therein, comprising a fastener element having leg portions insertable within the aperture and engageable with the side walls of the aperture to maintain the element in assembled relation with the support, said leg portions having opposed extensions at one end thereof, an anchorage plate secured to the member aforesaid, and a flexible element cooperating with portions of the anchorage plate at opposite sides of the latter to form bearings rotatably receiving the extensions to provide rocking movement of the legs about the axes of the extensions and to frictionally engage said extensions to resist rotation thereof.

12. A separable snap fastener for detachably securing a member to a support having an aperture therein, comprising a fastener element having leg portions insertable within the aperture and engageable with the side walls of the aperture to maintain the element in assembled relation with the support, said leg portions having opposed extensions at one end thereof, means rotatably receiving the extensions to provide pivotal movement of the legs about the axes of the extensions, said means comprising an anchorage plate secured to the member aforesaid, and a flexible disc cooperating with the plate to form bearings for the extensions and operable to frictionally engage the extensions.

13. A separable snap fastener for detachably securing a member to a support having an aperture therein, comprising a fastener element having outwardly bowed leg portions insertable into the aperture and engageable with the side walls of the aperture to maintain the element in assembled relation with the support, said leg portions having opposed extensions at one end thereof, and an anchorage plate secured to the member and having bearings rotatably receiving the extensions to provide swinging movement of the leg portions from a position substantially perpendicular to said member to a position substantially parallel to the latter, said bearings also being elongated in a direction transverse to the axes of the extensions providing shifting movement of the fastener element relative to the plate in a path parallel to the plane of said plate and thereby permitting the fastener element to align itself with the aperture.

14. A separable snap fastener for detachably securing a member to a support having an aperture therein, comprising a fastener element having outwardly bowed leg portions insertable into the aperture and engageable with the side walls of the aperture to maintain the element in assembled relation with the support, said leg portions having opposed axially aligned extensions at one end thereof, and an anchorage plate secured to the member aforesaid and having bearings rotatably receiving the extensions providing pivotal movement of the leg portions from a position substantially perpendicular to said member to a position substantially parallel to the latter and said bearings being elongated in a direction perpendicular to the axes of the extensions to provide limited shifting movement of the fastener element in two directions transversely to each other in a path parallel to the plane of the member to facilitate alignment of the fastener element with the aperture in said member.

FREDERICK N. ROSS.